Dec. 20, 1966 J. BAUDE 3,293,498
AUXILIARY ELECTRICAL POWER SYSTEM
Original Filed May 4, 1962 3 Sheets-Sheet 1

Inventor
John Baude
By Warren F. B. Lindsley
Attorney

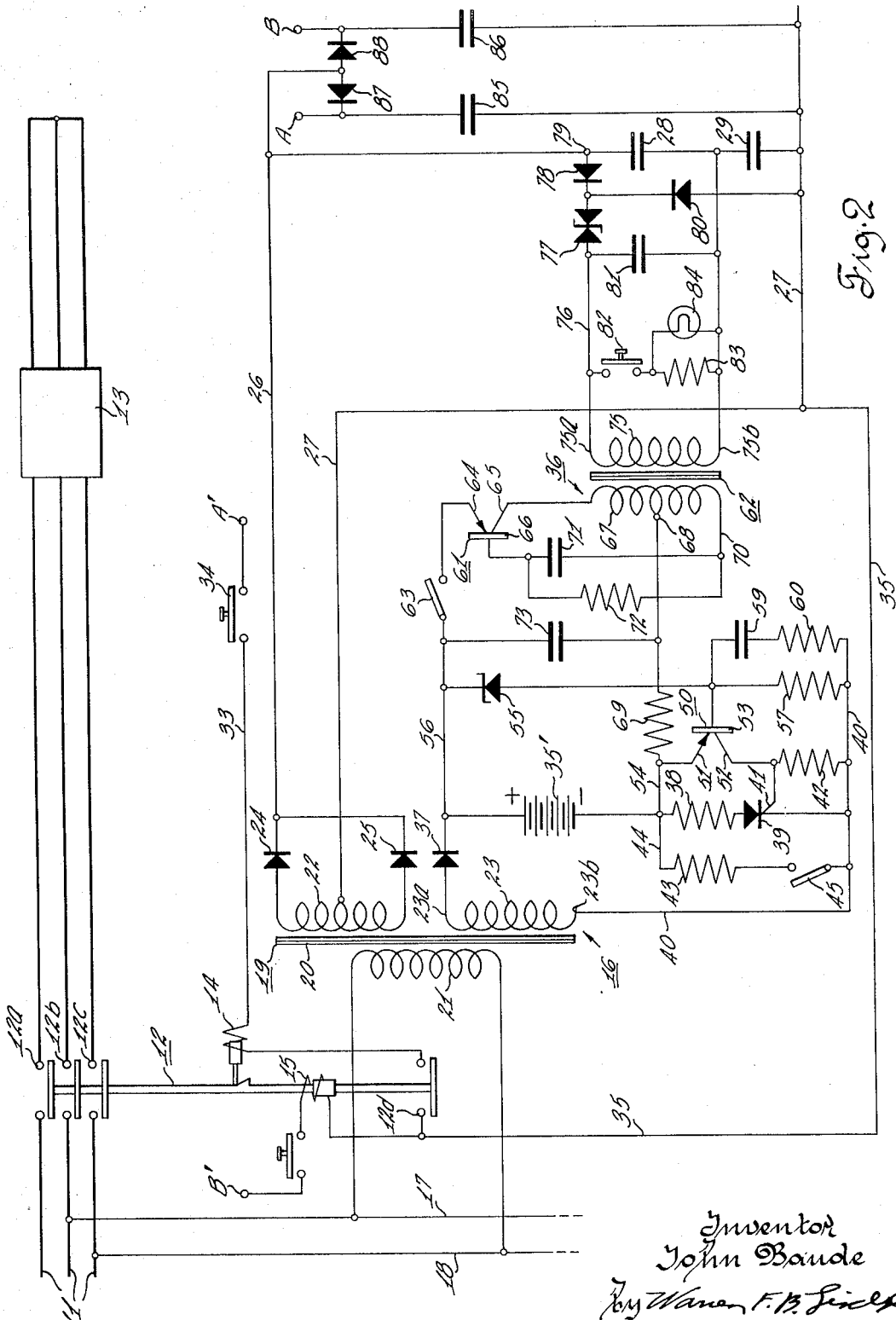

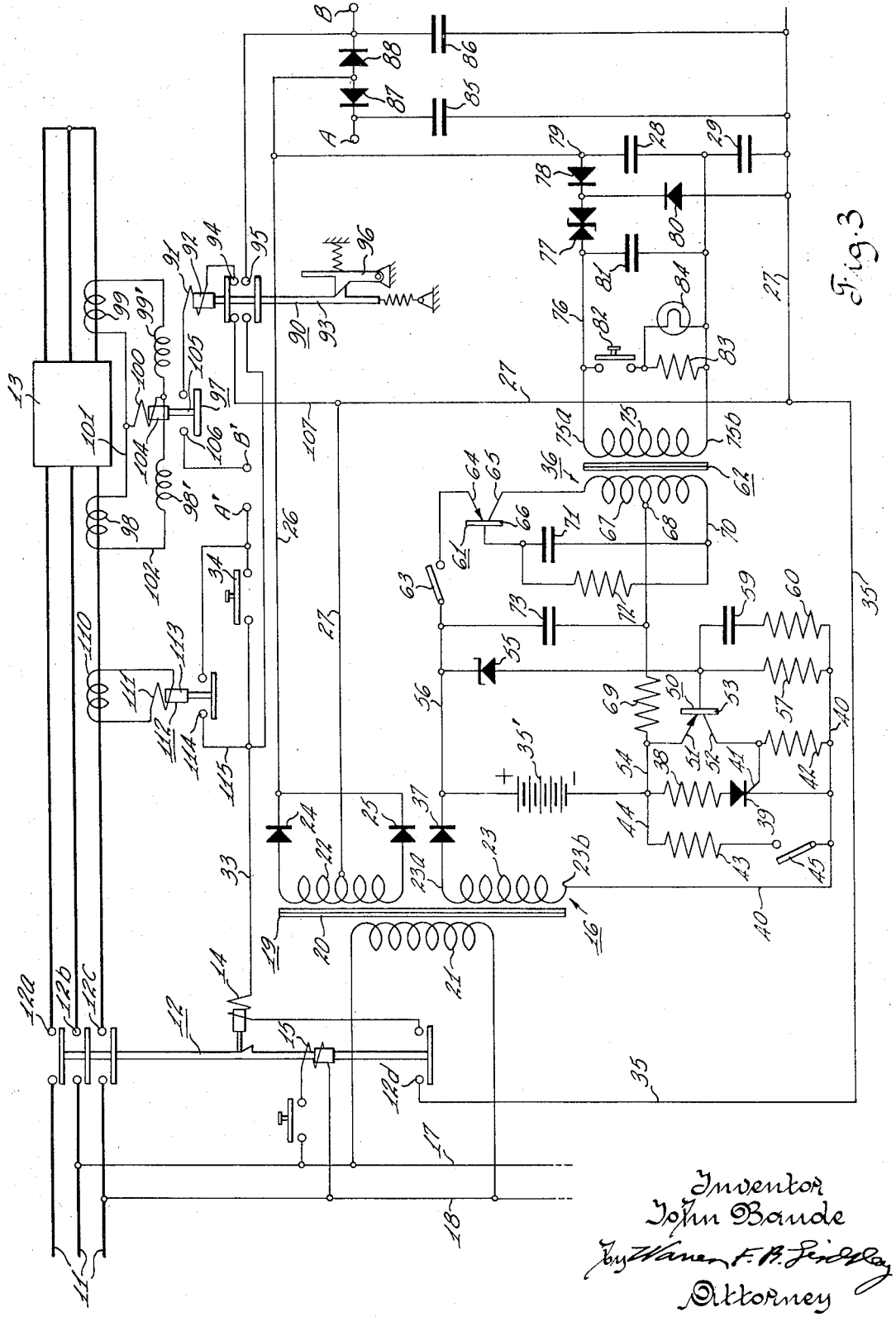

United States Patent Office 3,293,498
Patented Dec. 20, 1966

3,293,498
AUXILIARY ELECTRICAL POWER SYSTEM
John Baude, Milwaukee, Wis., assignor to Allis-Chalmers
Manufacturing Company, Milwaukee, Wis.
Continuation of application Ser. No. 192,579, May 4,
1962. This application Oct. 22, 1965, Ser. No. 507,608
2 Claims. (Cl. 317—50)

This application is a continuation of my copending application Serial No. 192,579, filed May 4, 1962, now abandoned, entitled "Auxiliary Electrical Power Device Employing Tandem Arrangement of Capacitors."

This invention relates to an auxiliary control power device and more particularly to a new and improved autocharged tandem arranged capacitor trip device for electrical loads such as, for example, circuit breakers.

Heretofore in order to provide maximum continuity of service and speed of operation particularly in the case of false and other abnormal conditions, electrical installations such as the large substations, generating stations, and centralized master control panels have utilized auxiliary 125 or 250 volt operating batteries. Such operating batteries provide a dependable source of D.C. power for control, indication, circuit breaker closing and tripping purposes during possible protracted loss of an A.C. power supply. The battery may even be of sufficient size to carry emergency lighting loads during an A.C. power interruption. Smaller substations utilize 24 or 48 volt tripping batteries to provide reliable power for circuit breaker interruption. This type of auxiliary battery power requires appreciable space and maintenance and often has the further disadvantage of relatively short life when used under wide ranges of temperature. In place of such an auxiliary battery source many installations have used a capacitor energized tripping device. This type of device requires a smaller space and less maintenance than the auxiliary battery devices. However, the capacitor energized tripping device has a charge available only for a short time after the A.C. control voltage fails.

Tripping power from a capacitor may not be available to trip, for example, a breaker upon reenergizing of a bus if a fault has occurred on the circuit while the bus is dead. This condition might occur during maintenance, under storm conditions, or during a test procedure.

The prior art autotrip devices employ a small self-contained standby source of power such as a rechargeable nickel-cadmium type battery which maintains the capacitor at full charge during A.C. power interruption. A small battery charger is utilized as part of the unit to maintain the standby autocharge battery at full voltage from the A.C. source. The low voltage of the battery is stepped up by the means of a voltage amplifier to the higher D.C. voltage required at the capacitor terminals. This type of device is small and compact in size and combines the static components with modern circuit techniques to result in an autocharged standby power device which had an expected life of many years under the usual temperature conditions encountered in service.

Serious shortcomings of this prior art type of device are known. One serious shortcoming is that once the capacitor has been discharged to trip, for example a circuit breaker, the battery takes at least 20 minutes to recharge the capacitor for a further tripping operation. In some instances it has been stated that several days were used to recharge the capacitor and the battery after the auxiliary power pack had been completely dissipated. To quickly reenergize such a prior art standby autocharge device the battery has to be removed and a fresh battery substituted therefor.

To overcome these shortcomings of the prior art a new and improved autocharged trip device is provided for electrical loads. This device employs a tandem arrangement of capacitor resistor parallel networks to prevent the simultaneous discharge of each capacitor connected to a common load. A current limiting device is employed with an oscillator for charging the capacitors and prevents the oscillator from stalling when the load connected to the autocharge device is short circuited. The battery is continually charged from the A.C. source and the battery discharge voltage is utilized as a reference voltage for terminating the quick charging cycle of the battery.

In accordance with the invention claimed, two electric storage devices are provided for supplying a load connected in electrical energy receiving relationship thereto. Means are provided for regulating the transfer of electrical energy from an A.C. source to one of the two storage devices. This regulating means provides an energy transfer from the source to the first storage device at a relatively low rate. Another means is provided for regulating the transfer of electrical energy from the source to the first storage device at a relatively high rate. Means are provided for charging continuously the second storage device from the first storage device. The load current and voltage at the load intermittently exceeds the capacity of the electrical source of energy.

It is an object of this invention to provide a new and improved standby stored energy power device.

Another object of this invention is to provide a new and improved autocharged device in which tandem operation of capacitor resistor parallel networks is provided for preventing simultaneous discharge of each capacitor connected to a common load.

A further object of this invention is to provide a new and improved autocharged device employing an oscillator which utilizes an overload device such that a short circuit across the load cannot stall the oscillator.

A still further object of this invention is to provide a new and improved autocharged device employing a rechargeable battery wherein the discharge voltage at the terminals of the battery is utilized for regulating the battery's charging cycle.

A still further object of this invention is to provide a new and improved autocharged device in which a tandem arrangement of resistor capacitor circuits is employed to compensate for the leakage current of the capacitors.

Objects and advantages other than those set forth will be apparent from the following description when read in connection with the accompanying drawings, in which:

FIG. 2 is a modification of the structure shown in FIG. 1 varied for multiple trip operations; and FIG. 3 is a further modification of FIGS. 1 and 2 wherein individual or simultaneous energization of a plurality of loads may occur from the standby auxiliary power supply.

Figure 1:
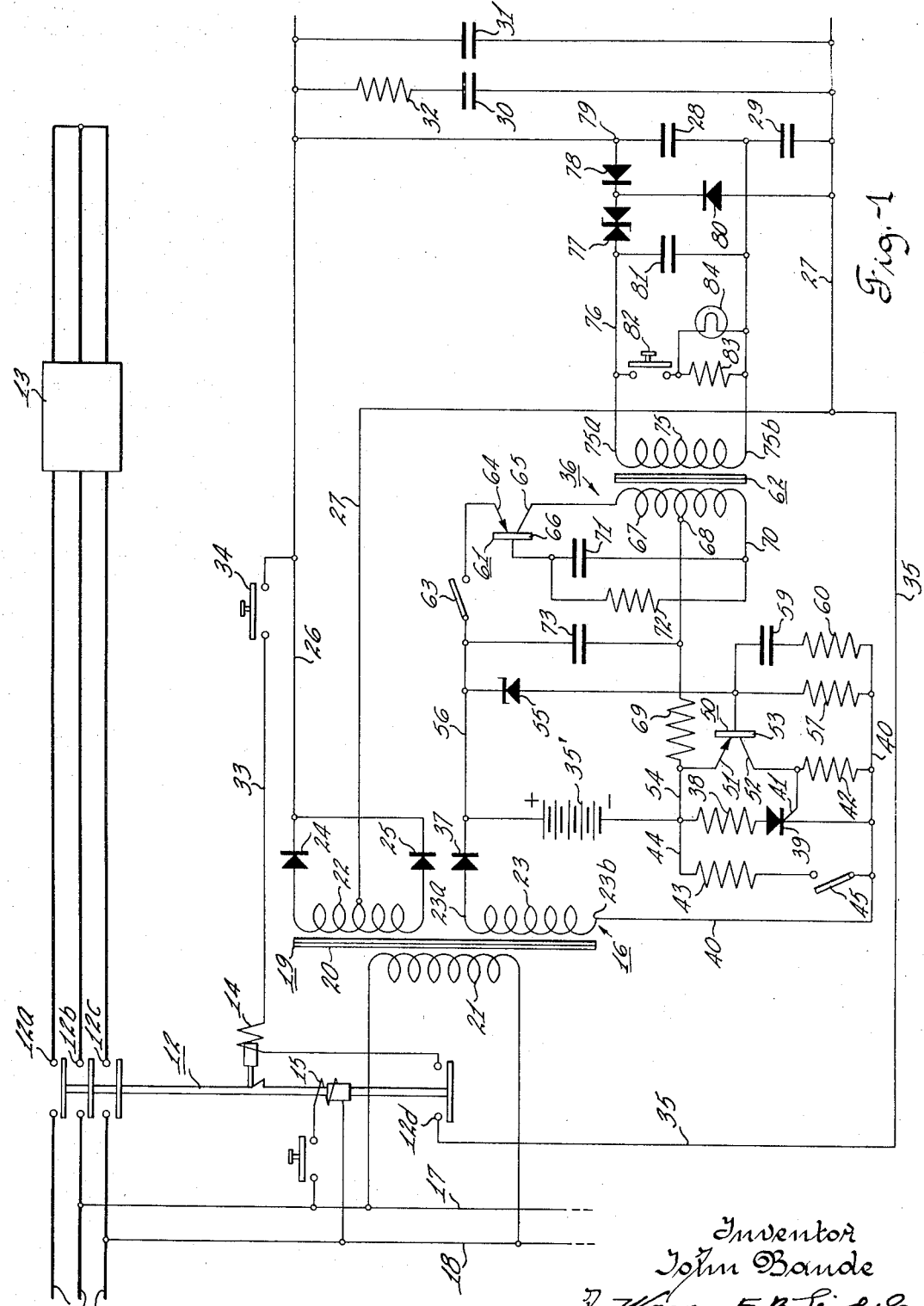
FIG. 1 is a diagrammatical illustration of the autocharged device connecting an A.C. source to a load and embodying the invention.

Referring more particularly to the drawing by characters of reference FIG. 1 discloses an electrical source of energy which may be, for example, a three phase interruptable alternating current source 11 connected through a circuit breaker 12 to a load 13. Circuit breaker 12 comprises contacts 12a, 12b, 12c and 12d and a pair of opening and closing coils 14 and 15 associated therewith in the usual manner. A standby stored energy power supply 16 is connected across the source of supply 11 through conductors 17 and 18, as shown.

The standby stored energy power supply 16 comprises a transformer 19 having a core 20, a primary winding 21 connected across conductors 17 and 18, and a pair of secondary windings 22 and 23. Secondary winding 22 is connected by means of diodes 24 and 25 and conductors 26 and 27 to a capacitor network comprising capacitors 28, 29, 30 and 31. Capacitors 28 and 29 are connected in series circuit across conductors 26 and 27. Capacitor 30 is connected in series with a resistor 32 across conductors 26 and 27 and in parallel with the series arrangement of capacitors 28 and 29. Capacitor 31 is connected across conductors 26 and 27 and in parallel with the series arrangement of capacitor 30 and resistor 32 and the series arrangement of capacitors 28 and 29.

The relative size of the capacitors in this network system is of importance since capacitor 31 furnishes directly the power which intermittently exceeds the capacity of source 11 to energize the load which in this instance is shown as the trip coil 14 of circuit breaker 12. Circuit breaker opening or trip coil 14 is connected across capacitor 31 through conductor 33, switch 34 and conductor 26 from one terminal thereof and through contacts 12d of circuit breaker 12 and conductors 35 and 27 from the other terminal thereof. It is necessary for satisfactory circuit breaker operation to charge capacitor 31 to a voltage sufficiently high to provide the necessary watt-second energy needed for energizing rip coil 14. Since the time of circuit breaker interruption of source 11 feeding load 13 and the clearing of the trip coil circuit associated with trip coil 14 is indefinite, it is noted that if only a single capacitor such as capacitor 31 is used for storing energy that this energy may be drawn out of the capacitor needlessly under conditions where the circuit break slowly opens its contacts.

One of the purposes of the new and improved standby power auxiliary storage device is to provide a source of stored energy which will be capable of providing multiple trip operations with certainty under conditions where the circuit breaker opening time varies within reasonable limits. For this reason a second storage device such as capacitor 30 is connected in parallel with the first storage device, namely capacitor 31 and continuously charges it. The time constant of capacitor 30 and resistor 32 is selected to be sufficiently long to extend beyond the time needed for a circuit breaker opening operation. By means of this arrangement it is possible to reserve a large amount of stored energy in capacitor 30 for a quick recharging of capacitor 31 during rapid open-close-open operations of circuit breaker 12. This sequence of operation is common where automatic reclosers are used in combination with manual controls for circuit breakers.

Capacitors 28 and 29 are relatively small in comparison to capacitors 30 and 31 and are used for the purpose of voltage duplication in connection with an associated transistor oscillator arrangement 36. Capacitance values for capacitors 30 and 31, for example, may be of the order of 300 to 500 microfarads and are sufficiently large to energize conventional circuit breaker operators. Resistor 32, for example, may be of the order of 1,000 ohms depending upon individual circuit breaker requirements. The size of transformer 19 and the impedance of its secondary winding 22 is selected to provide charging power for the capacitor network system to raise the operating voltage from zero to approximately 350 volts in a time equal to one second or less. This short charging time is necessary to provide positive trip power under conditions where A.C. power is available. Under this condition the circuit breaker may be operated an indefinite number of times in quick succession.

When A.C. power is available from source 11 the secondary winding 23 of transformer 19 is energized and provides charging power for a rechargeable multicell battery 35'. Terminal 23a of secondary winding 23 of transformer 19 is connected through a diode 37 to the positive terminal of battery 35'. The negative terminal of battery 35' is connected in series circuit with a resistor 38, a silicon controlled rectifier 39 and a conductor 40 to the other terminal 23b of secondary winding 23. The control gate 41 of silicon controlled rectifier 39 is connected through a resistor 42 to conductor 40. Under the conditions wherein battery 35' is fully charged silicon controlled rectifier 39 is cut off and does not pass current. Battery 35' therefore, is regulated and cannot be charged under these conditions except for the relatively low pulsed rate of the small half cycle current which is passed by resistor 43 connected at one end through a conductor 44 to the negative terminal of battery 35' and connected at the other end through a switch 45 to conductor 40 and terminal 23b of winding 23 of transformer 19. Resistor 43 is of such a valve that it provides only sufficient charging current to keep battery 35' at its rated voltage. Resistor 43 and/or silicon controlled rectifier 39 balance the electrical energy supply and demand for battery 35'.

A transistor 50 comprising emitter electrode 51, collector electrode 52 and base electrode 53 is connected between the negative terminal of battery 35' and conductor 40 and across resistor 38 and silicon controlled rectifier 39. Emitter electrode 51 of transistor 50 is connected through a conductor 54 to the negative terminal of battery 35' and collector electrode 52 of transistor 50 is connected through resistor 42 and conductor 40 to terminal 23b of secondary winding 23 of transformer 19. The control gate 41 of silicon controlled rectifier 39 is connected between the collector electrode 52 of transistor 50 and resistor 42. Base electrode 53 of transistor 50 is connected through a Zener diode 55 and conductor 56 to the positive terminal of battery 35' and through diode 37 to terminal 23a of secondary winding 23. Transistor 50 is cut off as long as the voltage of battery 35' exceeds the Zener voltage of Zener diode 55. This occurs because the base electrode 53 of transistor 50 is made more positive than emitter electrode 51 under these conditions. Should the battery voltage decrease below the Zener voltage rating of Zener diode 55, resistor 57 connected between base electrode 53 and conductor 40 acts to make base electrode 53 of transistor 50 more negative than its emitter electrode 51, and the control gate 41 of the silicon controlled rectifier 39 is then connected to conductor 54 through the low impedance current path which is now formed between the conductor 54, emitter electrode 51 and collector electrode 52 of transistor 50.

The silicon controlled rectifier 39 conducts under these conditions if current is passed by diode 37 from secondary winding 23 of transformer 19 and continues to pass current until the voltage of secondary winding 23 reverses its polarity. It is therefore apparent that during each positive half cycle the silicon controlled rectifier is triggered into conduction if the battery voltage falls below the Zener voltage rating of Zener diode 55. Thus, Zener diode 55 is a sampling means for measuring the discharge voltage of battery 35' and controls its charging rates. In this manner polarization voltage effects such as are noted during charging of the battery are minimized because during the negative half cycle of the voltage induced in secondary winding 23 the battery discharges into its load circuit. The differential between the discharge voltage of the battery and the Zener voltage of diode 55 is responsible for triggering the silicon controlled rectifier 39 into conduction in the next positive half cycle.

If desired, a capacitor 59 and resistor 60 may be connected in series circuit between base electrode 53 of transistor 50 and conductor 40. This circuitry improves the control of the silicon controlled rectifier 39.

With the circuitry disclosed, battery 35' may be regulated and is quickly recharged wtih a maximum allowable relatively high pulsed rate current, and the charging cycle cut off when the discharge voltage of the battery becomes higher than its normal voltage rating. Thus, the slow and high pulse rate charging regulating means for battery 35' controls the pulses fed to the battery so that the average value of the pulses fed to the battery does not exceed the maximum continuous rating of the battery. The current pulse amplitude, however, must be equal to or greater than the minimum value required to prevent polarity reversal of any cell of the storage battery. Battery 35' is connected by means of conductors 54 and 56 to a semiconductor magnetic controlled electromagnetic device 36 for varying the rate of charge from battery 35' to capacitors 30 and 31 inversely with the remaining charge on said capacitors.

The single transistor magnetic oscillator arrangement 36 may comprise a transistor 61 and a converter such as an oscillator 62 which is free running as long as switch 63 connecting it across battery 35' and secondary winding 23 of transformer 19 is closed. Transistor 61 comprising an emitter electrode 64, collector electrode 65 and a base electrode 66 has its emitter electrode 64 connected through switch 63 and conductor 56 to the positive terminal of battery 35' and through diode 37 to terminal 23a of secondary winding 23 of transformer 19. The collector electrode 65 of transistor 61 is connected to winding 67 of oscillator 62.

A midpoint 68 of winding 67 of oscillator 62 is connected through a resistor 69 to conductor 54. Conductor 54 is connected to the negative terminal of battery 35' and to terminal 23b of secondary winding 23 of transformer 19 through resistor 43, switch 45 and conductor 40. The other end of winding 67 is connected through a conductor 70 to a parallel arrangement of a capacitor 71 and a resistor 72 to the base electrode 66 of transistor 61. A capacitor 73 is connected between the midpoint 68 of winding 67 and conductor 56 as shown in FIG. 1.

The magnetic oscillator 62 is arranged to operate at between 4,000 and 5,000 cycles per second. The secondary winding 75 of oscillator 62 has one terminal 75a thereof connected through a conductor 76, a double anode Zener diode 77 and a diode 78 to a point 79 connected between capacitor 28 and conductor 26. Zener diode 77 prevents the reduction of the load impedance of trip coil 14, for example, beyond a predetermined level. A diode 80 is connected between diodes 77 and 78 and conductor 27. A capacitor 81 is connected between the terminal connection 75a of winding 75 of oscillator 62 and double anode Zener diode 77 and terminal 75b of winding 75. A series arrangement of switch 82 and resistor 83 is provided across winding 75. A suitable signal device such as lamp 84 is arranged in shunting arrangement with resistor 83.

Diodes 78 and 80 form a conventional voltage doubling circuit for charging the capacitor storage network of capacitors 30 and 31. Double anode Zener diode 77 is provided for preventing the short circuiting of the oscillator 62 to the point where operation of it is stopped. By this double anode diode arrangement transistor 61 is prevented from burning up. Further, diode 77 allows a complete discharge of capacitors 30 and 31 during normal operating cycle. Capacitor 81 provides the necessary switching energy for transistor 61 in its off cycle. A push button switch 82 is provided for connecting an indicating lamp 84 across the output terminal 75 of oscillator 62. When the push button is closed the operator can check the operation of the oscillator by observing the indicating light. Resistor 83 simulates the normal loading of the circuit and eliminates the capacitance effect of lamp 84, which may be a neon device, and would otherwise light under conditions where the standby storage device is malfunctioning.

Battery 35' is shown as a five cell nickel-cadmium device. The various charging and discharging characteristics of this type of battery vary considerably with the charging current and the percent of normal capacity to which the battery has been charged. This condition represents a problem for designers of battery operated auxiliary power systems. The battery should be used so as to provide several years of service without maintenance. Certain types of nickel-cadmium batteries can be overcharged for a long time without harming the cell structure, but the life of the battery is reduced if an extensive overcharge is permitted to exist for an extended period of time. In order to make a battery charging system of practical value the battery should be charged quickly after a complete discharge but this quick charge should be reduced to a small trickle charge as soon as the battery is fully charged. If the battery charging voltage alone is taken as a reference for restoring its normal capacity it is obvious that an automatic switching circuit must be provided to reduce the high rate of charging current to a trickle charge after full capacity of the battery has been reached. Battery charging conditions indicate that the normal capacity of the battery can be reached in various ways and with various charging currents all of which result in different charging voltages for the battery. Therefore, the charging voltage cannot be taken as a reference for terminating the wave charging cycle of the battery. Accordingly the half wave rectifier circuit and battery arrangement in combination with the silicon controlled rectifier and the Zener reference diode have been provided for terminating the quick charge cycle of the battery.

During normal operation of the auxiliary control power device when source 11 is energized capacitors 30 and 31 are continuously charged by secondary winding 22 of transformer 19. If switch 34 is closed the charge on capacitor 31 will energize coil 14 and trip open the circuit breaker 12. If source 11 fails capacitor 30 immediately starts to charge capacitor 31 and continues until its energy has been dissipated. While source 11 is energized secondary winding 23 also charges battery 35'. If the battery is discharged it is rapidly fully charged. If the battery is fully charged only enough energy is fed into the battery to retain its charged condition. If source 11 is interrupted and remains interrupted for any length of time battery 35' energizes oscillator 62 which charges capacitors 30 and 31 to the limit of the energy stored in the battery.

FIG. 2 illustrates a modification of FIG. 1 wherein like parts are given the same reference characters. Capacitors 30 and 31 and resistor 32 are replaced by capacitors 85 and 86 each arranged in series with diodes 87 and 88, respectively (as shown) across conductors 26 and 27. Terminal A arranged between capacitor 85 and diode 87 is connectable to terminal A' for furnishing the energy to trip the circuit breaker 12 through the energization of trip coil 14. Terminal B arranged between capacitor 86 and diode 88 is connectable to terminal B' for furnishing the energy to close the circuit breaker 12 through the energization of closing coil 15.

FIG. 3 illustrates a further modification of FIGS. 1 and 2 wherein like parts are given the same reference characters and wherein it is possible to trip several devices individually or simultaneously. A lockout relay 90 is provided comprising a closing coil 91, a core 92, an armature 93 biased in contact opening direction, and contacts 94 and 95. A hand reset lockout means 96 is provided for relay 90. Associated with relay 90 is a differential relay 97 comprising coils 98' and 99' in electrical association with current transformer 98 and 99 and a common conductor of source 11 but one on each side of load 13. A coil 100 of relay 97 is connected across conductors 101 and 102 which interconnects coils 98 and 99 in electrical series arrangement. Relay 97 further comprises a core 104 and an armature 105 in electrical association with coil 100. A pair of contacts 106 associated with armature 105 when closed complete a circuit between terminal B', coil 91 of relay 90, closed contacts 94 of relay 90, conductors 107 and 27 to capacitor 86. The energization of coil 91 of relay 90 causes the opening of its contacts 94 and the closing of contacts 95. One side of capacitor 86 is then connected through terminals B and B', closed contacts 106 of relay 97 and coil 91 of relay 90. Contacts 95 of relay 90 are connected in series with trip coil 14 of circuit breaker 12.

FIG. 3 also illustrates a current transformer 110 associated with one phase of source 11, and it is electrically connected to a coil 111 of relay 112. An armature 113 of relay 112 is associated with contacts 114. Contacts 114 when closed connect terminals A and A' from one side of capacitor 85 through conductors 115 and 33, trip coil 14, closed contact 12d, conductors 35 and 27 to the other side of capacitor 85. Energization of trip coil 14 causes tripping of circuit breaker 12.

Thus, the invention disclosed may be used for single or multiple operation of a given load or for substantial simultaneous operation of a plurality of devices.

Although a few embodiments of the present invention have been illustrated and described it will be apparent to those skilled in the art that various changes and modifications may be made therein without departing from the spirit of the invention or from the scope of the appended claims.

The embodiments of the invention in which an exclusive property or privilege is claimed are defined as follows:

1. Means for providing tripping energy for a circuit breaker comprising:
   tripping means responsive to a momentary current of predetermined amplitude for tripping the circuit breaker;
   first electrical energy storage means;
   means for charging the first storage means to a preselected level;
   inverter means energized by the first storage means for producing a relatively high voltage output;
   second electrical energy storage means connected to receive the output and to be charged thereby, said second storage means comprising a first circuit and a second circuit connected in parallel with both circuits connected to be charged by the rectified source, and said storage means including means to block current flow between said first circuit and said second circuit; and
   means for connecting a selected one of said first circuit or said second circuit across the tripping means.

2. Means for providing tripping energy for a circuit breaker comprising:
   tripping means responsive to a momentary current of predetermined amplitude for tripping the circuit breaker;
   first electrical energy storage means;
   means for charging the first storage means to a preselected level;
   inverter means energized by the first storage means for producing a relatively high voltage output;
   second electrical energy storage means connected to receive the output and to be charged thereby, said second storage means comprising a first circuit and second circuit connected in parallel, said first circuit having a first capacitance and a first diode connected in series with said first diode connected in a direction to pass current from the rectified source to the first capacitance and said second circuit comprising a second capacitance and a second diode with said second diode connected to pass current to said second capacitance, said diodes arranged to block current between the capacitances; and
   means for connecting a selected one of the capacitances across the tripping means to trip the circuit breaker.

References Cited by the Examiner

UNITED STATES PATENTS

| | | | |
|---|---|---|---|
| 3,018,432 | 1/1962 | Palmer. | |
| 3,064,163 | 11/1962 | Smith | 317—151 X |
| 3,098,947 | 7/1963 | Flieder | 320—1 X |
| 3,162,786 | 12/1964 | Kapteyn | 320—1 X |

MILTON O. HIRSHFIELD, *Primary Examiner.*

J. D. TRAMMELL, *Assistant Examiner.*